T. G. BAIRD.
SAFETY MECHANISM FOR MINE CAGES AND ELEVATORS.
APPLICATION FILED JUNE 28, 1910.
981,908.
Patented Jan. 17, 1911.
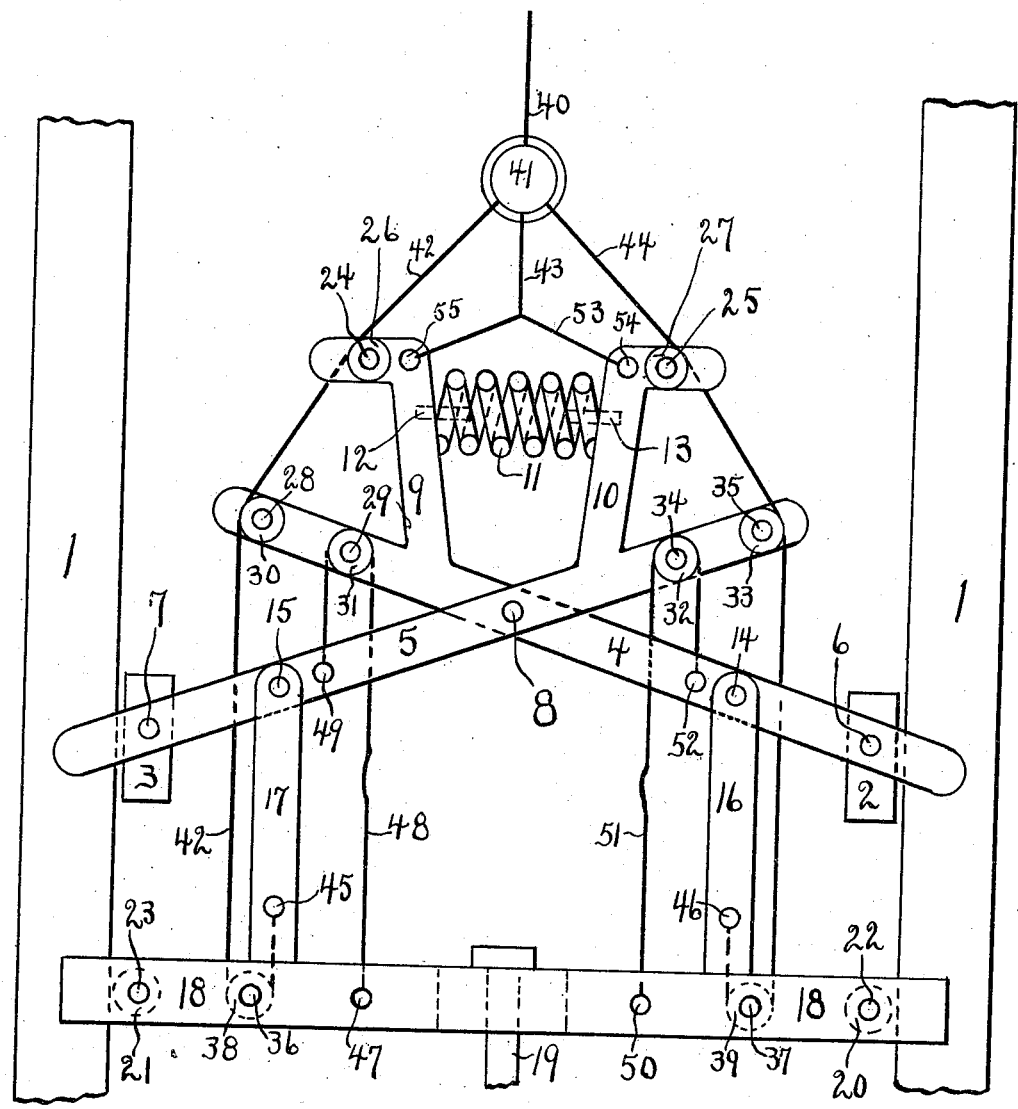

UNITED STATES PATENT OFFICE.

THOMAS G. BAIRD, OF LADD, ILLINOIS.

SAFETY MECHANISM FOR MINE CAGES AND ELEVATORS.

981,908.  Specification of Letters Patent.  Patented Jan. 17, 1911.

Application filed June 28, 1910. Serial No. 569,374.

*To all whom it may concern:*

Be it known that I, THOMAS G. BAIRD, a citizen of the United States, and resident of Ladd, in the county of Bureau and State of Illinois, have invented certain new and useful Improvements in Safety Mechanism for Mine Cages and Elevators, of which the following is a specification.

My invention relates to safety brake mechanism for mine cages and elevator cars.

It is also applicable to all other types of hoisting apparatus, such as lifts, hoists, et cetera, in which the car or vehicle traverses in and is guided in the shaft or well by guides or runners.

The object of my invention is to provide a safety brake mechanism of simple construction, one that is inexpensive to build and that is positive in operation and one which will instantly come into action on the breaking of the cable, rope or other part of the suspension gear, to retard and immediately bring the cage or car to rest, the first retarding action being actuated by means of a compressed spring and the final braking action being completed by means of the velocity and the weight of the cage or car itself.

The invention is shown in the accompanying drawing, which represents the safety brake mechanism and those parts of the suspension gear and guiding means in connection with which it operates, in front elevation.

In the drawing 1 represents the guides, 2 and 3 the brake shoes which operate adjacent to and engage the guides 1. Shoes 2 and 3 are pivotally connected to a shear frame comprising members 4 and 5 by means of pins 6 and 7, the members of the shear frame being pivotally connected with each other by means of a pin 8. The ends of members 4 and 5 adjacent to the guides extend over the guides on either side thereby always keeping the brake shoes in line with the guides. Projecting from members 4 and 5 are arms 9 and 10 respectively, between which a spiral spring 11 is retained tending always to force the arms 9 and 10 apart, which tends to force the shoes 2 and 3 against the guides 1, said spring 11 being held in position by means of pins 12 and 13 fastened in arms 9 and 10.

Pivotally connected to members 4 and 5 by means of pins 14 and 15 are struts 16 and 17 which abut on a horizontal member 18 which also engages the guides 1, and to which the cage or car, not shown, is fastened by means of a bolt 19. Member 18 has rolls 20 and 21 adjacent to guides 1 journaled on it by means of pins 22 and 23.

Journaled on arms 9 and 10 by means of pins 24 and 25 are pulleys 26 and 27. Journaled on member 4 by means of pins 28 and 29 are the pulleys 30 and 31. Similarly journaled and positioned on member 5 are the pulleys 32 and 33 by means of pins 34 and 35. On horizontal member 18 are journaled, by means of pins 36 and 37, the pulleys 38 and 39.

Fastened to the main hoisting cable or rope 40 is a ring 41 on to which are fastened three cables 42, 43 and 44 by means of which the safety brake is actuated and controlled. Rope or cable 42, one end of which is fastened to the ring 41, passes over pulleys 26 on arm 9, 30 on shear member 4 and 38 on the horizontal member 18 and then its end is fastened in aperture 45 in strut 17. Similarly rope 44 is fastened to the ring 41 and passes over pulleys 27 on arm 10, 33 on shear member 5, 39 on horizontal member 18, its end being fastened in aperture 46 in strut 16. It will be seen that if the main cable 40 is pulled the member 18 will be forced against the struts 16 and 17 which separate said member 18 and the shear frame composed of the members 4 and 5, and that the upper ends of members 4 and 5 are forced together by the action of the cables 42 and 44 pressing against the pulleys 26 and 30 on member 4 and pulleys 27 and 33 on member 5, compressing the spring 11 and holding the brake shoes 3 and 2 away from the guides 1. This action of the cables 42 and 44 is assisted by means of a cable or rope 43 which is connected to the center point of a cable 53 which is connected to a pin 54 on the arm 10 and a pin 55 on arm 9, said cable 53 being sufficiently long to remain loose or slack when the brake shoes 2 and 3 are against the guides 1, and 43 is of just the proper length, so that when the main cable 40 is taut, the spring 11 will be compressed.

It is evident from the above description, that in case the main cable 40 breaks or is left slack, the spring 11 will force the shear frame composed of members 4 and 5 apart causing shoes 2 and 3 to engage the guides 1 and start the braking action.

Fastened to member 18 on a pin 47 is a cable 48 which passes upwardly and over the pulley 31 journaled to shear member 4 by means of pin 29 and thence downwardly and is fastened to a pin 49 on shear member 5. Similarly a cable 51 is fastened to pin 50 on member 18 an equal distance from the center line of the device, and passes upwardly and over a pulley 32 journaled on the shear member 5 by means of a pin 34 and thence downwardly and is fastened to shear member 4 by means of a pin 52. It is evident, from the manner in which these cables 48 and 51 are connected with member 18 and the shear frame members 4 and 5, that a downward pull on each of these cables assists in forcing the brake shoes 2 and 3 against the guides 1 giving the final braking force and action. These cables 48 and 51 are left somewhat slack, as shown, so that when the cable 40 and the spring 11 has given the initial braking action stopping the shear frame composed of members 4 and 5, the car to which member 18 is attached will tend to go on, due to its inertia and weight, and exert a great force, forcing the brake shoes 2 and 3 against the guides stopping the entire mechanism and the car.

The bearing surface of the brake shoes can be made rough, or can be made of such suitable shape, that the braking action will be produced on the sides of the guides as well as on the front, as for instance the braking surface can be in the shape of an elongated V so as to be more effective in operation without exerting too great a pressure tending to spread the guides.

It will be understood, of course, that while I have here shown one form of my invention, I do not wish to be limited to the exact form shown, but wish to have it taken, in a sense, diagrammatic of any and all of such devices as come fairly within the scope of my claims.

I claim:

1. In a safety brake, a hoisting cable, a shear frame comprising two members pivotally connected, resilient means actuating said members, a brake shoe pivotally mounted on each of said members, a horizontal member adjacent to the shear frame, a strut pivotally connected to the lower limb of each of the members of the shear frame and abutting the horizontal member, pulleys suitably mounted on the upper limbs of the members of the shear frame and on the horizontal member, cables fastened to the lower end of the struts passing over a suitable number of said pulleys and connecting with the hoisting cable, and auxiliary cables fastened to the horizontal member passing upwardly over the other pulleys on the upper limb of each member of the shear frame and fastened to the lower limb of each member adjacent to said upper limb.

2. In a safety brake, a hoisting cable, a shear frame comprising two members pivotally connected, resilient means actuating said members, a brake shoe pivotally mounted on each of said members, a horizontal member adjacent to the shear frame, a strut pivotally connected to the lower limb of each of the members of the shear frame and abutting the horizontal member, pulleys suitably mounted on the upper limbs of the members of the shear frame and on the horizontal member, cables fastened to the lower end of the struts passing over a suitable number of said pulleys and connecting with the hoisting cable, auxiliary cables fastened to the horizontal member passing upwardly over the other pulleys on the upper limb of each member of the shear frame and fastened to the lower limb of each member adjacent to said upper limb, and supplementary means connecting the upper limbs of the shear frame with the hoisting cable.

3. A safety brake comprising a shear frame of two members pivotally connected, a brake shoe pivotally mounted on each member, stationary guides for said brake shoes to engage, resilient means between said shear members tending to force the brake shoes against the guides, a hoisting cable, a horizontal member adjacent to the shear frame, means connecting the horizontal member and the shear frame, said means comprising a strut pivotally connected to the lower limb of each member of the shear frame and abutting the horizontal member, pulleys journaled on the upper limb of each member of the shear frame and on the horizontal member, cables fastened to said struts and passing over the pulleys on the horizontal member and over a suitable number of the pulleys on the upper limbs of the members of the shear frame and connecting with the hoisting cable, and cables fastened to the horizontal member passing upwardly over the other pulleys on the upper limb of each of the members of the shear frame and fastened to the lower limb of each of said members adjacent to said upper limb.

4. A safety brake comprising a shear frame of two members pivotally connected, a brake shoe pivotally mounted on each member, stationary guides for said brake shoes to engage, resilient means between the shear members tending to force the brake shoes against the guides, a hoisting cable, a horizontal member adjacent to the shear frame, means connecting the horizontal member and the shear frame, said means comprising a strut pivotally connected to the lower limb of each member of the shear frame and abutting the horizontal member, pulleys journaled on the upper limb of each member of the shear frame and on the horizontal member, cables fastened to said struts and passing over the pulleys on the horizontal member and over a suitable number of the pulleys on the upper limbs of the members of the shear frame and connecting with the hoisting cable, cables fastened to the horizontal member passing upwardly over the other pulleys on the upper limb of each of the members of the shear frame and fastened to the lower limb of each of said members adjacent to said upper limb, and supplementary means connecting the upper limbs of said shear frame with the hoisting cable.

THOMAS G. BAIRD.

Witnesses:
 HENRY MASSIEON,
 G. H. EICKHOFF.